United States Patent Office 2,978,484
Patented Apr. 4, 1961

2,978,484
2,2-DINITROPROPANE-1,3-DINITRATE

Herman Plaut, Los Angeles, Calif., assignor, by mesne assignments, to Aerojet-General Corporation, Cincinnati, Ohio, a corporation of Ohio No Drawing. Filed Jan. 6, 1951, Ser. No. 204,819

1 Claim. (Cl. 260—467)

This invention relates to a new composition of matter and in particular to an organic polynitropolynitrate compound, useful for an explosive or for a propellant for rockets or the like.

The object of this invention is to provide an organic nitro-nitrate compound having two nitrate groups in the molecule in conjunction with two nitro groups.

A further object of this invention is to provide a process for synthesizing this type of material.

In my United States Patent No. 2,522,959, issued September 19, 1950, I have disclosed the compound 2,2-dinitropropanediol, having the formula:

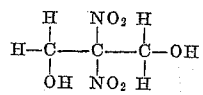

In accordance with my present invention, I have succeeded in forming a dinitrate derivative of 2,2-dinitropropanediol, which I call 2,2-dinitropropane-1,3-dinitrate, this having the formula:

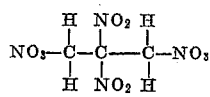

This compound contains sufficient oxygen in the molecule for complete combustion and also some additional oxygen which is released on decomposition. This makes it a powerful explosive; and also makes it effective for use in propellant compositions because it can supply oxygen for propellant.

I have discovered that I can convert the 2,2-dinitropropanediol to the dinitrate by reacting it with concentrated nitric acid, or a mixture of concentrated nitric acid and concentrated sulfuric acid; and conducting the reaction in the liquid phase.

The synthesis of this new dinitrate type of compound may be carried out as shown in the following examples:

Example I

One mole of 2,2-dinitro-1,3-propanediol

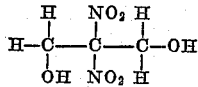

is treated with 5 moles of nitric acid having a specific gravity of approximately 1.5, which has been previously cooled to 0° C. The 2,2-dinitro-1,3-propanediol dissolves quickly in the acid and after solution is completed the temperature is permitted to rise to approximately room temperature, or 25° C. The solution is held at the temperature of 25° C. for some time, such as an hour, and then the reaction products are poured into a mixture containing equal proportions by weight of ice and water. An emulsion generally results when the reaction product and nitric acid are first added to the water; however, the dinitro-dinitrate being heavier than water, and being substantially soluble therein, will settle out in the form of a colorless oil. This oil layer is first taken up in ethyl ether $C_2H_5OC_2H_5$ and the aqueous portion of the mixture is also extracted with several portions of ether. The combined ether extracts are washed with water and then with 2% sodium bicarbonate solution to neutralize any excess acidity, and then washed again with water.

The washed ether extracts of dinitro-dinitrate are then separated and the ether layer is dried over anhydrous sodium sulfate. The ether can then be removed by evaporating at reduced pressure, leaving the dinitro-dinitrate in the form of a mobile oil.

Example II

An alternative method for the formation of 2,2-dinitropropane-1,3-dinitrate is: One mole of 2,2-dinitro-1,3-propanediol is added to a mixture of 125 grams of concentrated sulfuric acid having a specific gravity of approximately 1.83 and 125 grams of concentrated nitric acid having a specific gravity of approximately 1.5, the acid mixture having previously been cooled to 0° C. The 2,2-dinitro-1,3-propanediol is then allowed to dissolve into the acid and after solution is completed, the temperature is permitted to rise to 25° C. The solution is maintained at this temperature for about one hour and then the mixed acid solution and reaction product are carefully poured into a mixture of equal parts by weight of ice and water. The reaction product forms an emulsion, as in the previous example, which soon breaks down, permitting the heavy insoluble dinitro-dinitrate to settle out as a colorless oil. The oil is then ether-extracted in the manner described in the first procedure and the ultimate product is recovered in the same manner.

The 2,2-dinitro-propane-1,3-dinitrate has the following properties: It is a colorless mobile liquid which does not freeze above —65° C., has a refractive index $n_d^{20}=1.4675$ and density at $D^{31.5}=1.571$.

2,2-dinitro-propane-1,3-dinitrate is a compound which may serve satisfactorily as an explosive or as an oxygen donor in a propellant system. When oxidation is carried out to completion using stoichiometric proportions, the compound contains sufficient oxygen in the molecule to take care of all of the carbon and hydrogen and still has two oxygens left over. These may be used to supply oxygen to some substance which is deficient in its oxygen content.

If the substance is oxidized as in ordinary solid propellants, that is, where all the carbon is burned to carbon monoxide and two-thirds of the hydrogen is converted to water, this compound has still approximately six oxygens available which may be utilized to supply the necessary oxygen for fuels which are deficient in oxygen thereby making it possible to reduce the amount of oxidizers which would otherwise have been employed to carry the combustion of the propellant to the desired degree.

I claim:

As a new explosive composition of matter, 2,2-dinitropropane-1,3-dinitrate having the structural formula

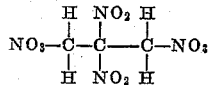

References Cited in the file of this patent
UNITED STATES PATENTS

| | | |
|---|---|---|
| 1,307,032 | Barab | June 17, 1919 |
| 1,691,955 | Bergeim | Nov. 20, 1928 |
| 2,066,506 | Woodbury et al. | Jan. 5, 1937 |
| 2,195,551 | Wyler | Apr. 2, 1940 |
| 2,241,492 | Vanderbilt | May 13, 1941 |
| 2,522,959 | Plaut | Sept. 19, 1950 |